United States Patent [19]
Gordon

[11] Patent Number: 5,517,873
[45] Date of Patent: May 21, 1996

[54] BICYCLE TRANSMISSION

[76] Inventor: Lester L. Gordon, 409 6th St., Natchitoches, La. 71457

[21] Appl. No.: 172,723

[22] Filed: Dec. 27, 1993

[51] Int. Cl.⁶ .................................................... F16H 3/08
[52] U.S. Cl. ............................. 74/325; 74/331; 280/238
[58] Field of Search ........................... 74/325, 331, 333, 74/335, 360, 361, 371, 372, 342, 504, 473 R; 280/236, 238

[56] References Cited

U.S. PATENT DOCUMENTS

| | | | |
|---|---|---|---|
| 1,322,388 | 11/1919 | Wood | 74/342 |
| 2,061,225 | 11/1936 | Duvall | 208/154 |
| 2,210,221 | 8/1940 | Sperry | 74/342 |
| 2,431,982 | 12/1947 | Barnett | 74/342 |
| 4,666,172 | 5/1987 | Hartmann . | |
| 4,823,641 | 4/1989 | Kuhn et al. . | |
| 4,955,247 | 9/1990 | Marshall . | |

FOREIGN PATENT DOCUMENTS 354866  12/1937  Italy ......................................... 74/342

*Primary Examiner*—Richard M. Lorence
*Assistant Examiner*—Peter Kwon
*Attorney, Agent, or Firm*—Richard L. Miller

[57] ABSTRACT

A bicycle transmission, comprising a primary axis mechanically linked to bicycle pedals, an intermediate axis, and a final axis, mechanically attached to the bicycle drive wheel. Gears of different sizes are located on each axis. The intermediate axis contains gears mounted in fixed locations along the intermediate axis. The primary axis has a group of gears that are movable along the primary axis so as to vary which gears on the primary axis engage gears on the intermediate axis. The final axis also has a group of gears that are movable along the final axis, so as to vary which gears on the final axis engage gears on the intermediate axis. Gear covers engage gears on the primary axis and final axis to move them along the primary axis and final axis, so as to obtain various combinations of gears, to vary the overall gearing ratios between the pedals and the drive wheel.

5 Claims, 2 Drawing Sheets

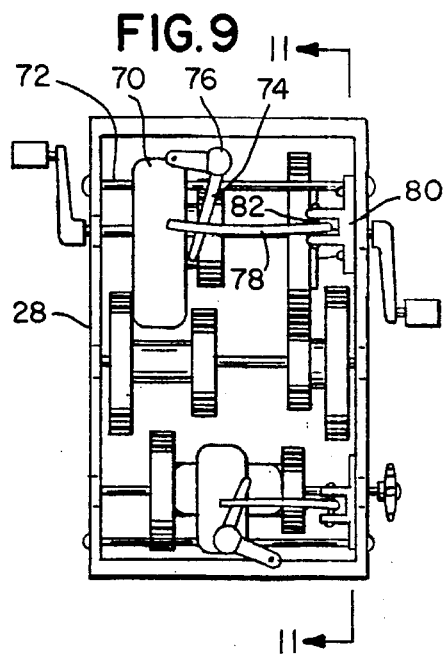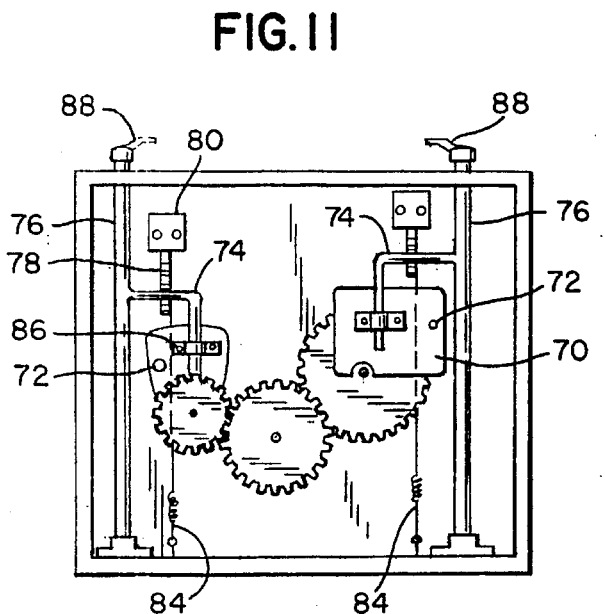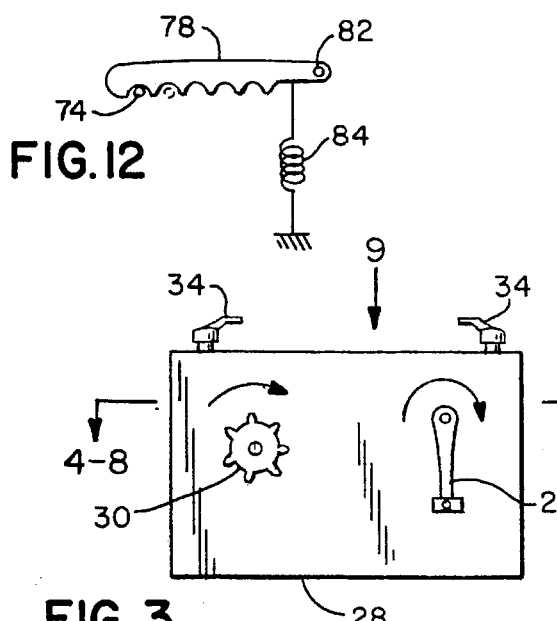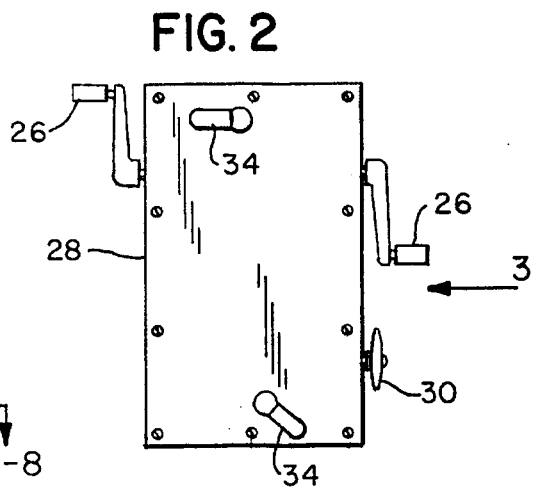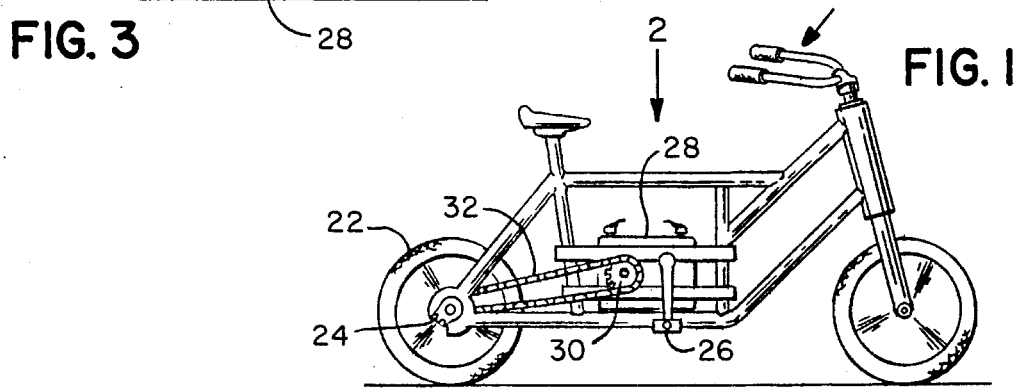

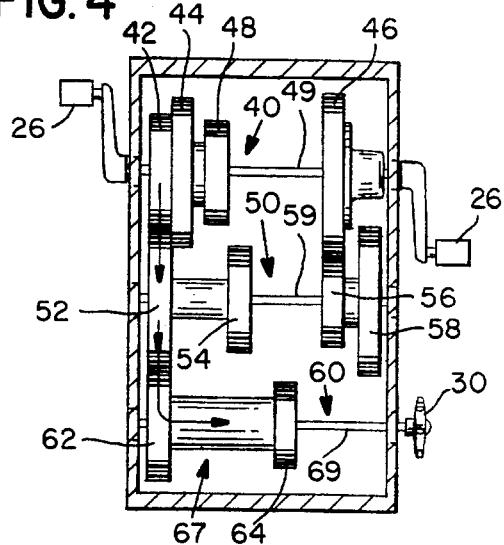
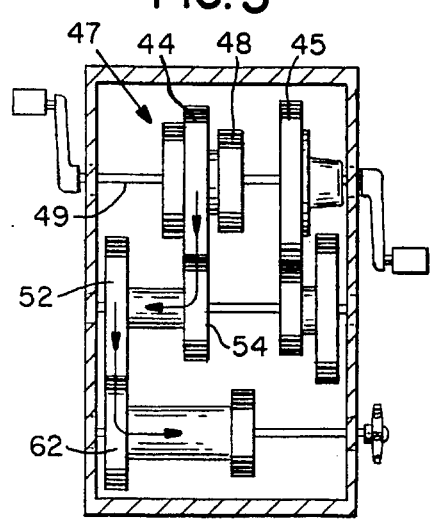
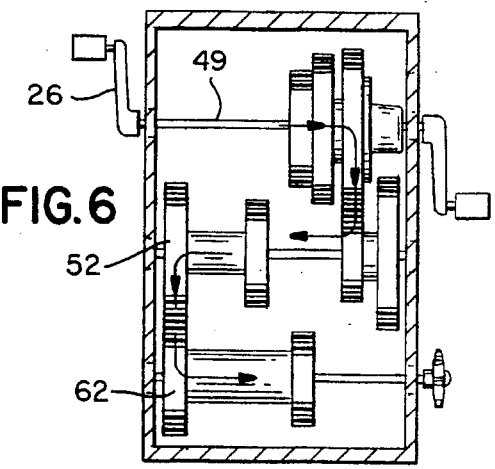
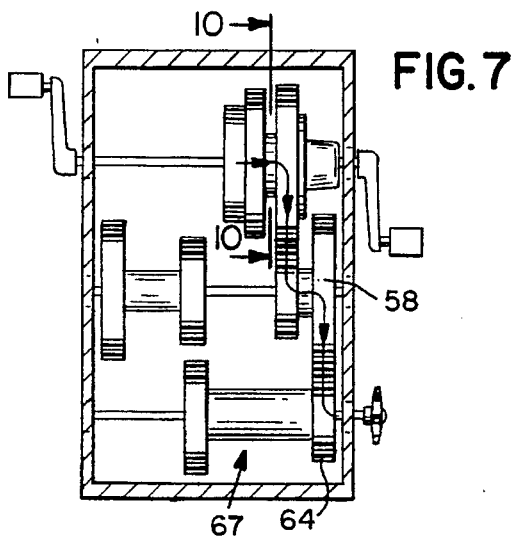
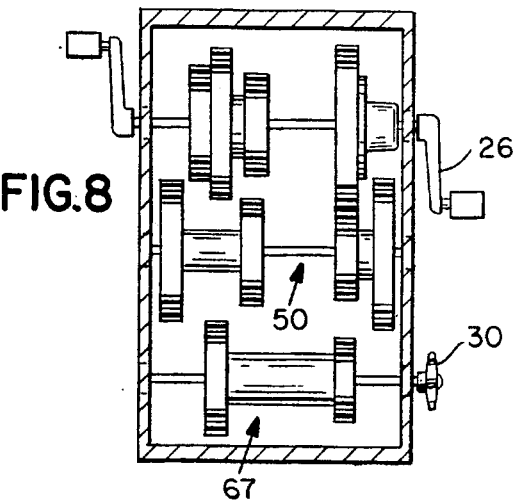
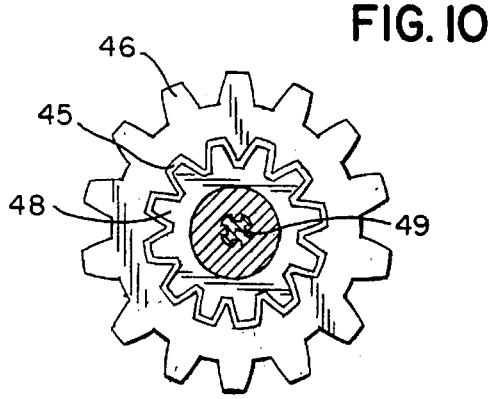

BICYCLE TRANSMISSION

BACKGROUND OF THE INVENTION

The invention relates to a bicycle transmission. The purpose of the bicycle transmission is to transmit power from the bicycle pedals to the bicycle wheels, achieving a variety of speeds and power ratios.

A standard bicycle has a drive wheel, linked to bicycle pedals by a chain and sprocket assembly. Over the years, bicyclists have found it desirable to vary the drive ratio to adjust to various riding conditions. Multi-speed bicycles were developed, having a series of gears alterable by the rider, to achieve different gear ratios for differing terrain.

Typical multi-speed bicycles involve a chain and sprocket gear changing system. In this system, the chain is lifted from its current gear and guided across a series of gears of different sizes by a derailleur. The chain eventually catches the desired gear, and power can be transmitted from the pedals to the rear wheel. This type of gear exchange system has several limitations.

First, the gear changing operation can be quite slow. Often, the chain does not catch the gear right away. In the interim, power cannot be transmitted to the rear wheel. This delay can be significant under some circumstances.

Second, the gear changing operation in unreliable. The chain sometimes gets caught in between the gears, and can sometimes fall off the gear group altogether. These circumstances can be dangerous when travelling at a high speed, and can be quite inconvenient at least.

Third, since the gearing changing system is typically external, at least in part, dirt is carried by the chain throughout the gearing system, requiring frequent maintenance and adjustment.

U.S. Pat. Nos. 4,666,172 to Hartman, and 4,823,641 to Kuhn et al., describe bicycle transmissions having planetary gearing arrangements.

U.S. Pat. No. 4,955,247 to Marshall, describes a bicycle transmission that is operable by a lever, rather than by a flexible cable.

While these units may be suitable for the particular purpose to which they address, or to general use, they would not be as suitable for the purpose of the present invention as hereafter described.

SUMMARY OF THE INVENTION

It is an object of the invention to produce a bicycle transmission system that overcomes the shortcomings of prior art bicycle transmissions.

It is another object of the invention to produce a bicycle transmission that is reliable in its operations.

It is further object of the invention to produce a bicycle transmission that is economical to manufacture.

It is a still further object of the invention to produce a bicycle transmission that is designed for long term durability, particularly by enclosing all gearing components within a housing.

The invention is a bicycle transmission, comprising a primary axis mechanically linked to bicycle pedals, an intermediate axis, and a final axis, mechanically attached to the bicycle drive wheel. Gears of different sizes are located on each axis. The intermediate axis contains gears mounted in fixed locations along the intermediate axis. The primary axis has a group of gears that are movable along the primary axis so as to vary which gears on the primary axis engage gears on the intermediate axis. The final axis also has a group of gears that are movable along the final axis, so as to vary which gears on the final axis engage gears on the intermediate axis. Gear covers engage gears on the primary axis and final axis to move them along the primary axis and final axis, so as to obtain various combinations of gears, to vary the overall gearing ratios between the pedals and the drive wheel.

To the accomplishment of the above and related objects, this invention may be embodied in the form illustrated in the accompanying drawings, attention being called to the fact, however, that the drawings are illustrative only and that changes may be made in the specific construction illustrated and described, within the scope of the claims.

BRIEF DESCRIPTION OF THE DRAWINGS

The drawings are briefly described as follows:

FIG 1 is a diagrammatic elevational view of a bicycle, with the instant invention installed thereon.

FIG. 2 is a top elevational view of the gearbox transmission component per se, with parts broken away, taken in the direction of arrow 2 in FIG. 1.

FIG. 3 is an elevational view taken in the direction of arrow 3 in FIG. 2.

FIG. 4 through FIG. 7 are diagrammatic top cross sectional views taken accordingly on line 4-8 of FIG. 3, with parts broken away, illustrating the engagement of various gears which permit different speeds and power ratios to be obtained.

FIG. 8 is a diagrammatic top cross sectional view, taken on line 4-8 of FIG. 3, with the cover removed, illustrating the shifting engagement mechanism.

FIG. 9 is a diagrammatic top plan view, taken in the direction of arrow 9 in FIG. 3, with the cover removed, illustrating the shifting engagement mechanism.

FIG. 10 is a diagrammatic top plan view, taken on line 10—10 in FIG. 7, illustrating the engagement of the spline mechanism transmitting power therethrough.

FIG. 11 is a partial sectional view taken on line 11—11 in FIG. 9, with parts broken away.

FIG. 12 is a diagrammatic elevation view, illustrating the gear shift engagement structure in greater detail.

DETAILED DESCRIPTION OF THE PREFERRED EMBODIMENT

In the drawings, like reference numerals depict like elements throughout the several views. In the text since there are many gears which need be distinguished from each other, for the sake of clarity and to help eliminate confusion, rather than call out a first gear, a second gear, a third gear, etcetera, gears are distinguished by a capital letter, that is A, B, C and D and specified on a particular axis primary, intermediate and final. Of course all gears are additionally numbered with numerals which appear on the drawings.

FIG. 1 illustrates the invention, as installed on a typical two wheel bicycle 20. The bicycle has a rear drive wheel 22, having a drive gear 24. One of two pedals 26 is shown, connected to a transmission housing 28. The transmission has an output gear 30, which drives the drive gear 24 with a chain 32.

A top view is shown in FIG. 2. The petals 26 are mounted to the side of the transmission housing 28, in their conventional diametrically opposed positions. Gear selection levers 34, are mounted at the top of the housing 28, to allow gears to be selected externally, as will be described in detail below. The output gear 30 is mounted on one side of the transmission housing 28.

FIG. 3 is an external view of the bicycle transmission, viewed from the sides. The direction of rotation of one of the pedals 26, and the output gear 30, is indicated.

The internal gearing arrangement is illustrated in FIG. 4. The gears are arranged on three major axes: a primary axis 40, an intermediate axis 50, and a final axis 60.

Mounted on the primary axis 40 is primary gear A 42, primary gear B 44, primary gear C 46, and a primary meshing gear 48. Primary gear A 42, primary gear B 44, and the primary meshing gear 48 are ganged together to form a primary group 47 on a primary splined shaft 49, so that all gears in the primary group 47 spin together, and the primary group 47 can move back and forth along the primary splined shaft 49. The splined shaft 49 is linked to the petals 26, so that power is conveyed from the petals to the primary group 47. Primary gear C 46 is normally not mechanically linked to the gears in the primary group 47, or to the pedals 26. Primary gear C 46, can be linked to spin together will all the remaining primary gears by moving the primary group 47 along the primary splined shaft 49, until the primary meshing gear 48 mates with primary gear C 46, which will be detailed below.

Mounted on the intermediate axis 50 is intermediate gear A 52, intermediate gear B 54, intermediate gear C 56, and intermediate gear D 58. The intermediate gears are located at fixed locations along an intermediate shaft 59.

Mounted on the final axis 60 is final gear A 62 and final gear B 64, which are ganged together in a final group 67. The final gears are mounted together on a final splined shaft 69. The final group 67 is adapted to move along the final splined shaft 69. The final splined shaft 69 is linked to the output gear 30, so that power is transmitted from the final group 67 to the output gear 30.

In FIG. 4, the primary group 47 is in a position along the primary splined shaft 49, so that primary gear A 42, meshes with intermediate gear A 52. The final group 67 is in a position along the final splined shaft 69, so that final gear A 62 is in mesh with intermediate gear A 52. In this first gearing position, power can be transmitted from the petals 26 to the output gear 30, along the path shown by the arrows in FIG. 4.

A second gearing position is illustrated by FIG. 5. The final gear A 62 is in mesh with intermediate gear A 52. The primary group 47 is in a position along the primary splined shaft 49, so that primary gear B 44, meshes with intermediate gear B 54. Power is thus transmitted as indicated by the arrows in FIG 5.

A third gearing position is illustrated in FIG. 6. Final gear A 62 is in mesh with intermediate gear A 52. In this 9 position, the primary meshing gear 48 is mated to primary gear C 46. Primary gear C 46 meshes with intermediate gear C 56. When the primary group 47 is in this position, power can be transmitted from the petals 26, through the primary splined shaft 49, through the primary group 47 to primary gear C 46. In this third gearing position, power is transmitted as indicated by the arrows in FIG. 6.

An alternate gearing position is illustrated in FIG. 7. Here the final group 67 is moved along the final splined shaft 69 so that final gear B 64 meshes with intermediate gear D 58.

With this alternate gearing position for the final group 67, three additional gearing positions are created. The first, second, and third gearing positions shown in FIG. 4, FIG. 5, and FIG. 6, produce a fourth, fifth, and sixth gearing position, respectively, when the final group 67, is in this position, as indicated in FIG. 7. The precise position indicated in FIG. 7 is the sixth gearing position, which is the gearing position as indicated by FIG. 6, with the final group 67 in the alternate gearing position.

FIG. 8 illustrates a neutral gearing position, where the final group 67 is in a position where it does not mesh with any gear on the intermediate axis 50. Therefore, there is no complete path for power to travel from the pedals 26 to the output gear 30.

The mechanism for switching gears is illustrated in FIG. 9. A gear cover 70 pushes the primary gear group 47 or the final gear group 67 along the primary or final splined shafts 49 or 69, by engaging the sides of the gears. The gear cover 70 travels along a guide rod 72, to ensure that the gear cover 70, is maintained in a position perpendicular to the gear group's axis, as it pushes the gear group along the axis. The gear cover 70 is moved by a shifting arm 74, attached to the side of the gear cover 70. The shifting arm 74 is also attached a shifting shaft 76. The shifting shaft 76 extends vertically from the bottom of the housing, and extends through the top of the housing, so that the shifting arm 74 can be controlled externally. A locking arm 78, attached to a locking arm bracket 80 with a locking arm pivot 82 helps the shifting arm 74 maintain its position, after the gear is properly selected.

The locking arm is best illustrated by FIG. 11 and FIG. 12. A spring 84, secured to the bottom of the housing 28, helps the locking arm 78 maintain the shifting arm 74 in its selected position. FIG. 11 shows how the shifting arm 74 is mounted to the gear cover 70, with a cover mounting bracket 86. FIG. 11 further illustrates the various components used to move the each gear group on its axis. Gear selection levers 34 are connected to the shifting shafts 76, on the outside of the housing. These gear selection levers 34, allow the gears to be selected from outside the bicycle transmission housing by the bicyclists. The external selection links 88 can be controlled by a flexible cable, or by the rider reaching the links 88 with his/her hand in which case it is a handle, other suitable means.

The engagement of primary gear C 46 with the primary meshing gear 48 is shown in FIG. 10. Primary gear C 46, has a recessed portion 45, within which the primary meshing gear 48 fits, so that power can be efficiently transmitted between the two. Note that primary gear C 46 is an independent gear with respect to the primary group, and is not normally driven by the primary splined shaft 49, unless engaged with the primary meshing gear 48 as previously described. The primary splined shaft 49, is also illustrated in FIG. 10.

It is contemplated that the individual gears will differ, so that various overall gearing ratios between the pedals and the bicycle drive wheel will be achieved. In achieving different overall gearing ratios the bicyclists' needs for speed and for power can be properly balanced.

What is claimed is:

1. A bicycle transmission, comprising:
  a) a primary axis, mechanically driven by bicycle pedals and containing primary gears, where the primary axis further comprises: a splined shaft, the splined shaft having at least one gear and a meshing gear ganged together to form a primary group, the primary group movable along the splined shaft; and an independent gear, the independent gear normally not mechanically connected to the splined shaft, but the independent gear is adapted to receive the meshing gear to mechanically connect the independent gear with the primary group;

b) an intermediate axis, having intermediate gears mechanically driven by at least one primary gear; and c) a final axis, driven by at least one intermediate gear, the final axis mechanically connected to a bicycle drive wheel, so that power from the bicycle pedals is transmitted to the bicycle drive wheel.

2. A bicycle transmission, comprising:

a) a primary axis, mechanically driven by bicycle pedals and containing primary gears, a splined shaft, the splined shaft having at least one gear and a meshing gear ganged together to form a primary group, the primary group movable along the splined shaft; and an independent gear, the independent gear normally not mechanically connected to the splined shaft, but the independent gear is adapted to receive the meshing gear to mechanically connect the independent gear with the primary group;

b) an intermediate axis, having intermediate gears mechanically driven by at least one primary gear;

c) a final axis, driven by at least one intermediate gear, the final axis mechanically connected to a bicycle drive wheel, so that power from the bicycle pedals is transmitted to the bicycle drive wheel; and d) a shifting means for moving the gears along at least one of the primary axis and the final axis, to vary which gear on that axis meshes with which gear on the intermediate axis.

3. A bicycle transmission, comprising:

a) a primary axis, mechanically driven by bicycle pedals and containing primary gears, a splined shaft, the splined shaft having at least one gear and a meshing gear ganged together to form a primary group, the primary group movable along the splined shaft; and an independent gear, the independent gear normally not mechanically connected to the splined shaft, but the independent gear is adapted to receive the meshing gear to mechanically connect the independent gear with the primary group;

b) an intermediate axis, having intermediate gears mechanically driven by at least one primary gear;

c) a final axis, driven by at least one intermediate gear, the final axis mechanically connected to a bicycle drive wheel, so that power from the bicycle pedals is transmitted to the bicycle drive wheel; and d) a shifting means for moving the gears along at least one of the primary axis and the final axis, to vary which gear on that axis meshes with which gear on the intermediate axis, where shifting means are present for moving the gears along both the primary axis, and on the final axis, to vary which primary gears and final gears mesh with which intermediate gears, so that different gearing ratios can be achieved.

4. A bicycle transmission, comprising:

a) a primary axis, mechanically driven by bicycle pedals and containing primary gears, a splined shaft, the splined shaft having at least one gear and a meshing gear ganged together to form a primary group, the primary group movable along the splined shaft; and an independent gear, the independent gear normally not mechanically connected to the splined shaft, but the independent gear is adapted to receive the meshing gear to mechanically connect the independent gear with the primary group;

b) an intermediate axis, having intermediate gears mechanically driven by at least one primary gears;

c) a final axis, driven by at least one intermediate gear, the final axis mechanically connected to a bicycle drive wheel, so that power from the bicycle pedals is transmitted to the bicycle drive wheel; and d) a shifting means for moving the gears along one of the primary axis and the final axis which further comprises:

i) a gear cover, for engaging the sides of the gears, so that the gears may be moved along their axis;

ii) a shifting arm, for moving the gear cover along the axis; and iii) a locking arm, for helping the shifting arm maintain its position after it has been moved into a suitable position.

5. A bicycle transmission, comprising:

a) a primary axis, mechanically driven by bicycle pedals and containing primary gears, a splined shaft, the splined shaft having at least one gear and a meshing gear ganged together to form a primary group, the primary group movable along the splined shaft; and an independent gear, the independent gear normally not mechanically connected to the splined shaft, but the independent gear is adapted to receive the meshing gear to mechanically connect the independent gear with the primary group;

b) an intermediate axis, having intermediate gears mechanically driven by at least one primary gear;

c) a final axis, driven by at least one intermediate gear, the final axis mechanically connected to a bicycle drive wheel, so that power from the bicycle pedals is transmitted to the bicycle drive wheel; and d) a shifting means for moving the gears along at least one of the primary axis and the final axis, to vary which gear on that axis meshes with which gear on the intermediate axis, where the shifting means for moving the gears along the primary axis and final axis further comprises:

i) a gear cover, for engaging the sides of the gears, so that the gears may be moved along their axis;

ii) a shifting arm, for moving the gear cover along the axis; and iii) a locking arm, for helping the shifting arm maintain its position after it has been moved into a suitable position.

* * * * *